3,398,332
ELECTROLYTE IMPERVIOUS SEAL FOR
ELECTROLYTIC CAPACITOR
Gerrard Alphonsus Logan, Uphall, West Lothian, Scotland, assignor to Sprague Electric Company, Adams, Mass., a corporation of Massachusetts
Filed Sept. 13, 1965, Ser. No. 486,865
Claims priority, application Great Britain, Oct. 21, 1964, 42,998/64
2 Claims. (Cl. 317—230)

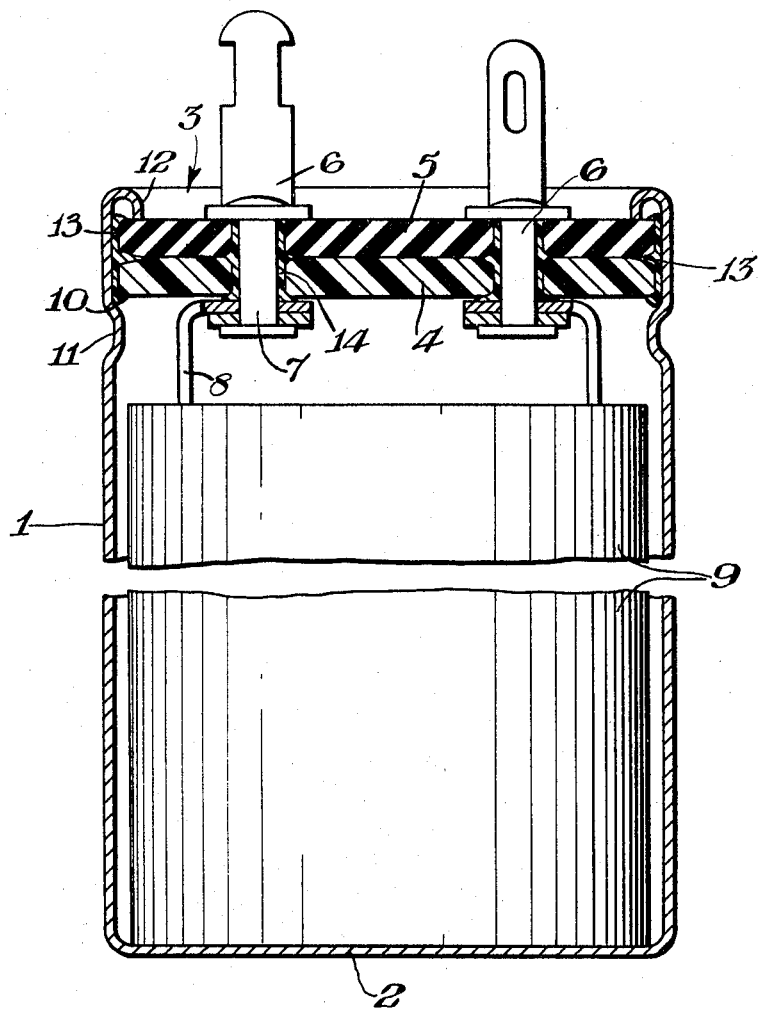

ABSTRACT OF THE DISCLOSURE

A capacitor container is closed by a conventional disc assembly having at least one terminal passing therethrough. Potential electrolyte leakage paths around the edge of the disc assembly and around the terminal are sealed by a thick paste or gel which is formed by interaction between powder material at the potential leakage paths and electrolyte from the capacitive element within the container.

---

The invention relates to an electrolyte impervious seal for an electrolytic capacitor and a method of making the same, and in particular to means and method for sealing the container in which the capacitive element of an electrolytic capacitor is enclosed.

The capacitive element of an electroylic capacitor of the foil type to which this invention is particularly directed generally comprises a pair of convolutely wound foil electrodes with absorbent separator material betwen them, and impregnated with a liquid electrolyte. The absorbent separator serves to hold the electrolyte in contact with the electrodes where it is required, but the electrolyte is frequently of rather low viscosity and tends to drain away unless prevented, thus shortening the useful life of the unit. It is therefore necessary to seal the electrolyte within whatever housing or container is used to enclose the capacitive element, but difficulty has been encountered in obtaining efficient and reliable seals. The container is frequently in the form of a can closed at its open end by a disc carrying terminal assemblies projecting therethrough. When capacitors of this type are mounted with the disc downwards, there is a particular danger that the electrolyte will seep out through any imperfection in the seals between the disc and the can and around the terminal assemblies.

It is an object of this invention to overcome the foregoing and related disadvantages of prior art sealing of electrolytic capacitors.

Another object of the invention is to provide an improved electrolyte impervious sealing method and means for electrolytic capacitors.

These and other objects of this invention will become more apparent upon considration of the following description and accompanying drawing, in which:

The sole figure is a cross-section of an electrolytic capacitor constructed in accordance with this invention.

In general, the objects of this invention are attained by an electrolytic capacitor construction having a capacitive element enclosed within a container wherein leakage of electrolyte from the container is prevented by provision at potential leakage paths of a thick paste or gel which cannot be permeated by the electrolyte.

The invention also provides a method of sealing a container enclosing an electrolytic capacitive element against leakage of electrolyte, the method having the steps of assembling the element within the container with an initial material at potential leakage paths which forms on contact with a conventional glycol-borate electrolyte a sealing material which cannot be permeated by the electrolyte.

By way of example only, an electrolytic capacitor embodying the invention is described below with reference to the drawing. The capacitor illustrated has a container in the form of a tubular metal can 1 having an integral closed end 2. The open end of can 1 is closed by a composite disc 3 comprising a rigid inner plastic layer 4 and an outer rubber layer 5. Terminal assemblies 6 extend through the disc 3 and are electrically connected at their inner ends 7, as by rivetting or welding, to wires or tabs 8 projecting from an electrolytic capacitive element 9 within the can. The element 9, which is not in itself a part of the present invention, comprises foil electrodes with absorbent separator material between them rolled into a generally cylindrical shape, the tabs 8 being in electrical communication each with a respective foil electrode and projecting from the end of element 9 nearer the composite disc 3.

The composite disc 3 rests on a shoulder 10 provided by an internal beading 11 near the open end of can 1. The open end is turned over inwardly so that its edge 12 engages the upper surface of the composite disc 3 afforded by the rubber layer 5. To perfect the seal between the disc 3 and the can 1 a thick paste or gel 13 is provided about the edge of the disc 3 so as to fill completely any space between this edge and the adjacent part of the inner wall of the can, that is, between the beading 11 and the turned-over edge 12 (such space being exaggerated in the drawing). The paste is similarly provided around the stems of the terminal assemblies 6, particularly between these stems and the edges of the disc 3 defining the apertures in which the assemblies 6 are received, as at 14. The paste is not however confined to the inner and outer edges of the disc 3 but can extend onto the adjacent plane surfaces, for example, over the areas of engagement with the shoulder 10 and spun-over edge 12.

The method of assembly of the capacitor of this invention is to form the capacitive element 9 and the composite disc 3, the latter being rumbled in a suitable powder prior to connection of the lugs 8 of the element 9 to the terminal assemblies 6 carried by the disc. The disc 3 and the element 9, impregnated with a conventional liquid electrolyte, are then placed within the can 1, the transverse dimension of the element 9 being less than the inner diameter of the beading 11 of the shoulder 10 on which the disc 3 is made to rest. Assembly is completed by spinning over the edge 12 of the can 1 onto the disc 3 to hold it in place against the shoulder 10.

At this stage no substantial contact between the powder and the liquid electrolyte will have taken place, but as soon as electrolyte from the element reaches the powder, a paste is formed, as at 13 and 14 of sufficient viscosity to prevent further passage of the electrolyte.

The preferred material for the initial coating of powder on the composite disc is ethyl hydroxy-cellulose. Other suitable powder materials include starch and gum tragacanth which, like the preferred ethyl hydroxy-cellulose, form on contact with conventional glycol-borate electrolytes a thick paste or gel that is permeable to gas formed during operation of the capacitor, but which cannot be permeated by the electrolyte.

Other powder materials within the scope of this invention include hydroxy- or carboxy-alkyl, aryl or alkaryl cellulose or salt thereof. Again, within this class of cellulosics, ethyl hydroxy-cellulose is preferred because of the seal produced thereby when contacted by a glycol-borate electrolyte.

The two layers of the disc 3 are formed by stamping, apertures for receiving the terminal assemblies being provided in the same operation, and there is consequently some roughness at the stamped edges which ensures that they pick up ample powder during the rumbling step.

Powder also tends to penetrate between the layers 4 and 5 of the disc to some extent. Consequently the paste is readily formed where it is most required. Any powder which the electrolyte does not reach because of the paste it has formed at the inner side of the powder layer is of course surplus, but no special operation for its removal is required.

The capacitor unit as described is thus most effectively sealed against loss of electrolyte and can be used with the terminal assemblies downwards without any risk of a shortened life.

It will be appreciated that the use of the sealing method and means of the invention is not confined to the electrolytic capacitor housing as described but is capable of general application whatever form of housing is required to be sealed.

What is claimed is:

1. An electrolytic capacitor comprising a container having an open end, a capacitive element impregnated with electrolyte within said container, a disc assembly having at least one terminal passing therethrough, said disc assembly closing said open end, an impermeable paste or gel sealing the potential electrolyte leakage paths between said disc assembly and said container and around said terminal, said paste or gel being formed in situ by contact between carbohydrate material in said paths and said electrolyte.

2. The electrolytic capacitor of claim 1 wherein said electrolyte is a glycol-borate electrolyte and said material is ethyl hydroxy-cellulose.

References Cited

UNITED STATES PATENTS

| | | | |
|---|---|---|---|
| 3,056,072 | 9/1962 | Schroeder et al. | 317—230 |
| 3,248,613 | 4/1966 | Griffin et al. | 317—230 |
| 3,333,165 | 7/1967 | Broadbent | 317—230 |
| 3,335,335 | 8/1967 | Perkins | 317—230 |

JAMES D. KALLAM, *Primary Examiner.*